United States Patent
Sinha et al.

(10) Patent No.: US 9,001,199 B2
(45) Date of Patent: Apr. 7, 2015

(54) SYSTEM AND METHOD FOR HUMAN DETECTION AND COUNTING USING BACKGROUND MODELING, HOG AND HAAR FEATURES

(75) Inventors: Aniruddha Sinha, Kolkata (IN); Rohit Gupta, Kolkata (IN); Ayan Chaki, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 966 days.

(21) Appl. No.: 13/160,743

(22) Filed: Jun. 15, 2011

(65) Prior Publication Data

US 2012/0274755 A1 Nov. 1, 2012

(30) Foreign Application Priority Data

Apr. 29, 2011 (IN) .......................... 1359/MUM/2011

(51) Int. Cl.
  *H04N 9/47* (2006.01)
  *G06K 9/00* (2006.01)
(52) U.S. Cl.
  CPC .................................. *G06K 9/00369* (2013.01)
(58) Field of Classification Search
  CPC ....... H04N 7/147; H04N 7/142; H04N 7/148; H04N 7/15; H04N 7/141
  See application file for complete search history.

(56) References Cited

U.S. PATENT DOCUMENTS

| | | | |
|---|---|---|---|
| 7,373,012 B2 | 5/2008 | Avidan et al. | |
| 8,478,068 B2 * | 7/2013 | Miyashita | 382/276 |
| 2009/0322906 A1 * | 12/2009 | Watanabe | 348/231.99 |

OTHER PUBLICATIONS

Chris Stauffer, W.E.L Grimson, "Adaptive background mixture models for real-time tracking", CVPR 1998.
Zoran Zivkovic, "Improved Adaptive Gaussian Mixture Model for Background Subtraction", ICPR 2004.
Brendan J. Frey, Nebojsa Jojic, "A Comparison of Algorithms for Inference and Learning in Probabilistic Graphical Models", IEEE Transactions on Pattern Analysis and Machine Intelligence, vol. 27, No. 9, Sep. 2005.
Mei Xiao, "An improved background recondtruction algorithm based on basic sequential clustering", Information Technology Journal 7(3): 522-527, 2008.

(Continued)

*Primary Examiner* — William C Vaughn, Jr.
*Assistant Examiner* — Daniel Tekle
(74) *Attorney, Agent, or Firm* — Akerman LLP; Peter A. Chiabotti; Roy P. Zachariah (57) ABSTRACT

A system for adaptive learning based human detection for channel input of captured human image signals, the system comprising: a sensor for tracking real-time images of an environment of interest; a feature extraction and classifiers generation processor for extracting a plurality of features and classifying the features associated with time-space descriptors of image comprising background modeling, Histogram of Oriented Gradients (HOG) and Haar like wavelet; a processor configured to process extracted feature classifiers associated with plurality of real-time images; combine the plurality of feature classifiers of time-space descriptors; evaluate a linear probability of human detection based on a predetermined threshold value of the feature classifiers in a time window having at least one image frame; a counter for counting the number of humans in the real-time images; and a transmission device configured to send the final human detection decision and number thereof to a storage device.

11 Claims, 5 Drawing Sheets

(56) References Cited

OTHER PUBLICATIONS

Saeid Fazli, Hamed Moradi Pour, Hamed Bouzari, "A novel GMM-Based Motion Segmentation Method for complex background", The 5th IEEE-GCC Conference, Kuwait, Mar. 16-19, 2009.

Jianguang Lou, Hao Yang, Weiming Hu and Tieniu Tan, "An Illumination Invariant Change Detection Algorithm", ACCV2002: The 5th Asian Conference on Computer Vision, Jan. 23-25, 2002, Melbourne, Australia.

J. Mike McHugh, Janusz Konrad, Venkatesh Saligrama, and Pierre-Marc Jodoin, "Foreground-Adaptive Background Subtraction", IEEE Signal Proc. Letters, 2009.

Donovan H. Parks and Sidney S. Fels, "Evaluation of Background Subtraction Algorithms with Post-processing", AVSS, 2008.

Oncel Tuzel, Fatih Porikli, Peter Meer, "Pedestrian Detection via Classification on Riemannian Manifolds", IEEE Transactions on Pattern Analysis and Machine Intelligence, vol. 30, No. 10, Oct. 2008.

\* cited by examiner

SYSTEM AND METHOD FOR HUMAN DETECTION AND COUNTING USING BACKGROUND MODELING, HOG AND HAAR FEATURES

CROSS-REFERENCE TO RELATED APPLICATIONS AND PRIORITY

The present application claims priority to Indian Patent Application No. 1359/MUM/2011, filed on Apr. 29, 2011, the entirety of which is hereby incorporated by reference.

FIELD OF THE INVENTION

The present application relates to a system and method for image information processing, and more particularly relates to a precise human detection by distinguishing the target object from background by combining different algorithms.

BACKGROUND

Human detection techniques in an image or video typically employ a traditional method of background modeling. Human detection has significance in various fields, particularly in security and surveillance applications, where automatic human body detection is a key enabler, e.g., for applications in robotics, surveillance, and in an Intelligent Transport System (autonomous vehicle and automatic driver-assistance system).

For any object detection in an image, the image signals are processed for training set based classification, feature extraction for feature vector and principal component analysis, pattern recognition and wavelet transformation for employing convolution. For human detection, the extracted feature classifiers associated with the image are processed particularly employing Histogram of Oriented Gradient (HOG) for human detection and Haar wavelet transformation technique for face detection.

In the human detection techniques disclosed hitherto, the contour features obtained from the objects by extracting edges are employed as important features. In general, in the human detection techniques disclosed in the prior art, human detection and image processing takes place through supervised learning using training data set of small edge regions and hierarchical supervised learning thereof.

However, the probability of the detection of a human subjected to various unfavorable conditions that includes distorted image signals, background mix-up with object and human posture unavailability in the training data set, is significantly poor. However, a Haar-like wavelet transformation offers a formidable face detection technique in differential convolution analysis, however, it suffers from a higher threshold value associated with extracted features. Another impediment to precise human and face detection is the wide variability of data objects in the images.

A quality of an object detection system depends on the feature extraction; amongst others a Haar-like feature provides enhanced features for object detection. In field of car detection, a combination of Haar-like feature and HOG is a way to encode an input image to obtain a vector of visual descriptors. Haar-like features and concept of Region of Interest (ROI) are observed to significantly to increase probability of object detection. However, time and space considerations for detection of certain advance descriptors and use thereof along with HOG and Haar is not substantially disclosed in the prior art.

There are a plurality of techniques and algorithms taught in the prior art for detection of human using Support Vector Machine (SVM) based HOG features and human face detection using SVM based Haar features and background modeling (BG). However, these algorithms individually work and produce good results on a limited data set and mostly for color images.

Some of the lacunae that exists in the prior art are that, a single Background Modeling (BG) algorithm does not work for all the types of backgrounds and also with changing backgrounds. Moreover, if the color of the dress of the person is similar to the background then the probability of detection reduces considerably. In case of infrared (IR) images, color information is not present and hence the BG works on gray level images (single channel information), hence the performance of BG is not to the appreciable level.

In training set based systems, the SVM based HOG features classifier requires training with 1000s of positive images and 10000s of negative images to achieve a good result. This can never have 100% precision as it is not possible to know all possible human postures and it will have some false positives. The major problem lies in the training data set where the postures of the people can be of various types and when tested with new images with a new environment it will have always have some errors in detecting the people.

The SVM based Haar feature classifier for face detection works well for color images and whenever the face area in the image is substantially large. In case of IR images, gray scale images and when people are sitting far from the sensor (the faces covering 50×50 pixels or less) then that leads to lot of errors in the detection of the face.

SUMMARY

Before the enablement of the present systems and methods are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

The principle objective is to provide a system and method for adaptive learning based human detection and counting using adaptive background modeling (BG), HOG and Haar features.

Another significant objective is to perform the image enhancements in a Region of Interest (ROI) where the BG has detected a change so that the further signal processing for human detection can perform better.

Another objective is to derive and reconstruct the background from no prior information about the background for real time systems.

Yet another objective is to improve a combined probability of detecting a human i.e. classification based on the output of BG, human detection algorithm and face detection algorithm.

Still another objective is to combine the BG, HOG and Haar output over space and time to take a collective decision on the presence of human.

In one aspect a method for an adaptive learning-based human detection is configured for at least one channel input of captured human image signals in order to detect and count the number of humans present in an indoor or outdoor environment for security and surveillance applications, wherein the channel input of captured human image signals comprises of Infrared (IR) image or color image.

In another aspect, initially, a plurality of window frames of real time images associated with at least one human is acquired by employing at least one sensor, wherein the images capture an indoor or outdoor environment associated with the human. In one exemplary embodiment, the sensor can be any one of an IR sensor, color camera, or at least one interference sensor.

Upon acquiring the plurality of window frames of real time images, an adaptive learning based human detection system extracts features classifiers and combines the extracted feature classifiers of time or spatial domain based descriptors, evaluates a linear probability of human detection based on predetermined threshold value of feature classifiers, counts the number of humans in the acquired image and sends the final human detection decision and number thereof to at least one actionable or storage means for security and surveillance purposes.

In one aspect, a feature extraction and classifiers generation means of the system extracts a plurality of features and classify the extracted features associated with time or spatial domain based descriptors of image, wherein the features comprises of background modeling, HOG and Haar-like wavelet.

In another aspect, a processor of the system is configured to process the extracted feature classifiers associated with plurality of real-time images, wherein the process can be any known signal processing operations in order to detect the presence of at least one human in the image. The processor can be any one of a computer, Laptop, PDA, Microcontroller, Microprocessor or any other computational device.

Upon processing the features, a means of the system combines the plurality of feature classifiers of time or spatial domain based descriptors, wherein the features comprises of background modeling, HOG and Haar-like wavelet.

Upon combining the plurality of feature classifiers, a means of the system evaluates a linear probability of human detection based on predetermined threshold value of feature classifier in at least one window frame of the image, wherein the evaluation can be comparison of the threshold associated with the combined output of the feature classifiers generated from BG, HOG and Haar with the predefined threshold for human detection decision making. In a preferred embodiment, the predefined threshold can be obtained by combining the weaker classifier associated with the image due to long distance image capture, color of the image and lesser face exposure, etc.

In another aspect, a counter of the system counts the number of humans in the image upon evaluating the linear probability of human detection, wherein the counter can be any one of the generally known counters.

In another aspect, a transmission means of the system is adapted to send the final human detection decision and number thereof in at least one image of real-time human tracking to at least one actionable or storage means for security and surveillance purposes, wherein the transmission means can be any one of the generally known transmission means. In a preferred embodiment, the actionable or storage means is a remote server.

The above proposed system and method disclosed for human detection can be easily extended to include detection of any other object, counting thereof within the scope of the application for the person skilled in the art.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The present application provides a system and method for adaptive learning based human detection and counting using adaptive background modeling (BG), HOG and Haar features.

Figure 1:
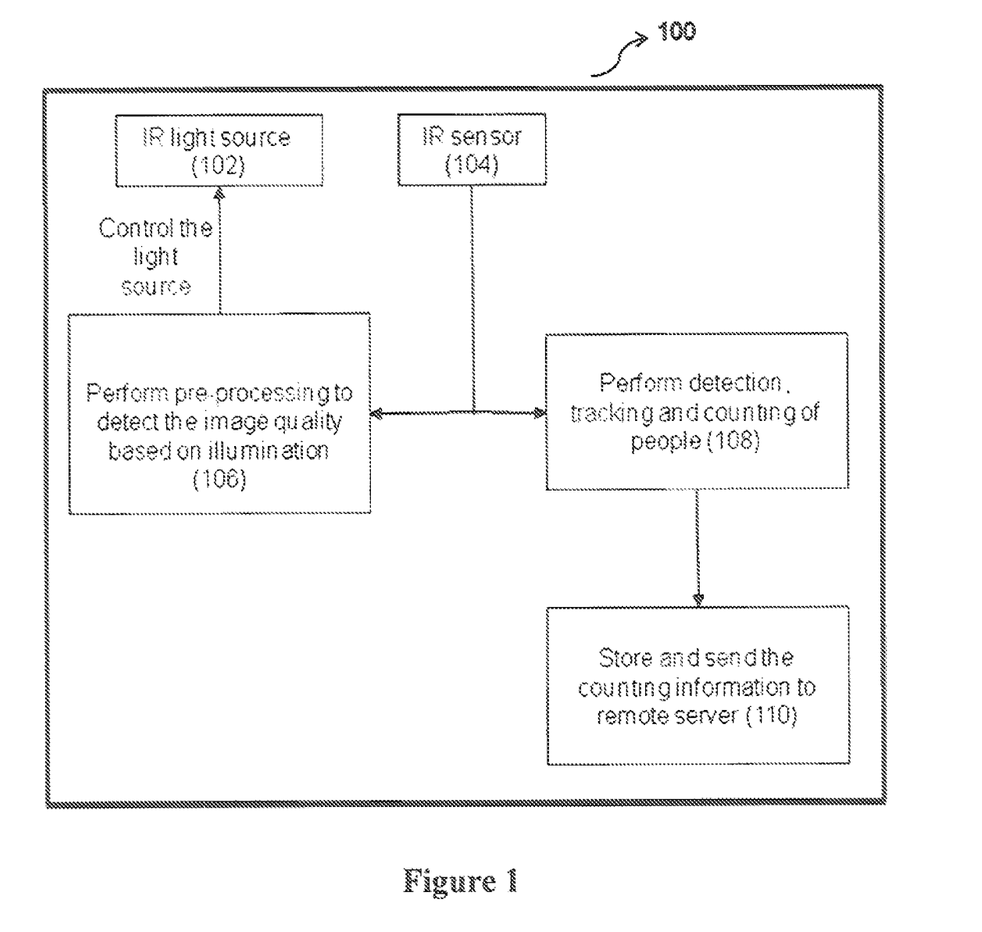
FIG. 1 shows system architecture for the human detection, tracking and counting.

FIG. 1 shows system architecture 100 for the human detection, tracking and counting. According to one exemplary embodiment, a system 100 comprises a light source 102, a sensor 104, a remote server 110, a processor 112 (not shown in the figure), a feature extraction and classifiers generation means 114 (not shown in the figure), combining means 116 (not shown in the figure), evaluation means 118 (not shown in the figure), a counter 120 (not shown in the figure) and transmission means 122 (not shown in the figure). The light source 102 is selected based on the sensor 104, wherein the sensor 104 is selected from an IR sensor, color camera, and at least one interference sensor, etc. In a preferred embodiment, the light source 102 is an IR light source and the sensor 104 is an IR sensor 104. The light source 102, IR sensor 104, remote server 110, feature extraction and classifiers generation means 114, combining means 116, evaluation means 118, counter 120 and transmission means 122 are connected to the processor 112 by a communication network, wherein the communication network is selected from the internet, intranet, WAN, LAN, MAN, etc. In a preferred embodiment, the communication network is LAN. According to another embodiment, the static color camera can be used to extract color images instead of extracting the IR images by using the IR light source 102 and the IR sensor 104 for detecting in the indoor and/or outdoor environment. The processor 112 is selected from a computer, Laptop, PDA, Microcontroller, Microprocessor or any other computational device. In a preferred embodiment, the processor 112 is computer.

Initially, the IR light source 102 is initiated to illuminate the IR rays by the processor 112 continuously in the indoor and/or outdoor environment. According to one exemplary embodiment, the IR light source 102 is located in the outdoor environment. The IR sensor 104 continuously senses the reflection from the object present in the outdoor environment and/or captures the image information for human detection, wherein the object can be human, tree, traffic sign, and any other objects and sends the reflection to the processor 112. In a preferred embodiment, the object is a human.

Upon receiving the reflection, the processor 112 performs pre-processing 106 to detect the image quality based on illumination. If the image quality is less than the set value by the processor 112, then subsequently the processor 112 controls the IR light source 102 until the image quality reaches the value that is equal to the set value. If the image quality is equal or more than the set value, then the system 100 performs detection, tracking and counting of people 108.

Upon acquiring the plurality of window frames of real time images, the feature extraction and classifiers generation means 114 extracts a plurality of features classifiers and classify the extracted features associated with the time or spatial domain based descriptors of image, wherein the features comprises of background modeling, HOG and Haar-like wavelet.

Upon classification of the features, the processor 112 is configured to process extracted feature classifiers associated with plurality of real-time images, wherein the process can be any known signal processing operations in order to detect the presence of at least one human in the image. The means 116 is used for combining a plurality of feature classifiers of time or spatial domain based descriptors, wherein the features comprises of background modeling, HOG and Haar-like wavelet.

Upon combining the plurality of feature classifiers of time or spatial domain based descriptors, the means 118 evaluates a linear probability of human detection based on predetermined threshold value of feature classifier in at least one window frame of the image. In a preferred embodiment, the evaluation is a comparison of the threshold associated with the combined output of the feature classifiers generated from BG, HOG and Haar with the predefined threshold for human detection decision making. The predefined threshold can be obtained by combining the weaker classifier associated with the image due to long distance image capture, color of the image and lesser face exposure, etc.

The counter 120 counts the number of humans in the image upon evaluating the linear probability of human detection, wherein the counter 120 can be any one of the generally known counters. Finally, the transmission means 122 is adapted to send the final human detection decision and number thereof in at least one image of real time human tracking to at least one actionable or storage means 110 for security and surveillance purposes, wherein the transmission means 122 can be any one of the generally known transmission means. In a preferred embodiment, the actionable or storage means 110 is remote server 110.

The above said detection, tracking and counting of people 108 can be done by the system 100 in various methods. The said methods are explained below in the subsequent drawings 2, 3, 4 & 5 respectively.

Figure 2:
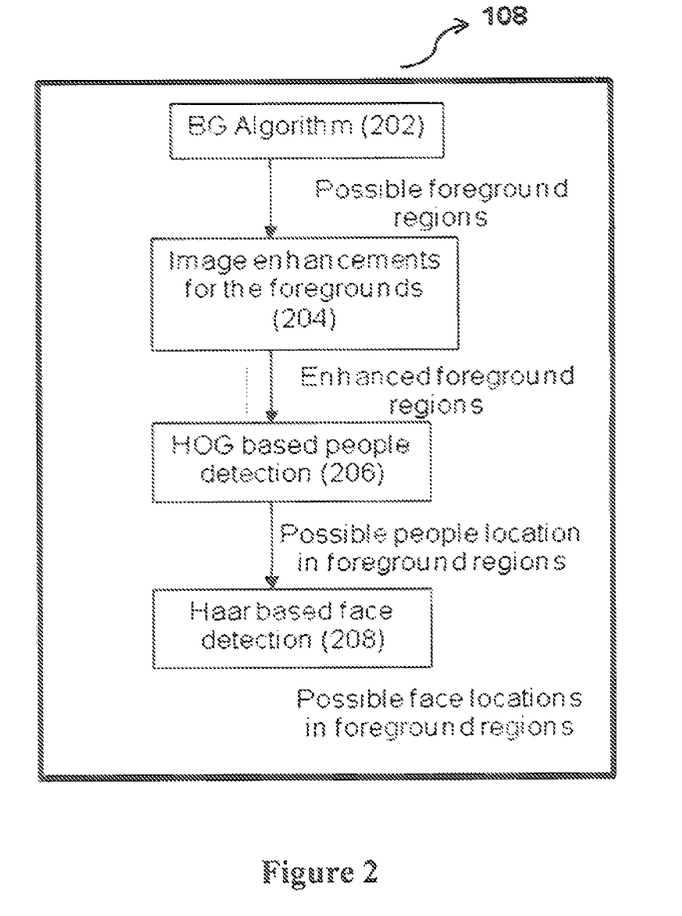
FIG. 2 illustrates a method of combining BG, HOG and Haar with respect to region of interest in cascaded form.

FIG. 2 illustrates a method 108 of combining BG, HOG and Haar with respect to region of interest in cascaded form. In the initial step of the proposed method, a plurality of window frames of real time images associated with at least one human is acquired by employing at least one sensor 104, wherein the images capture an indoor or outdoor environment associated with the human. In one exemplary embodiment, the sensor 104 can be any one of an IR sensor, color camera, or at least one interference sensor.

In the next step 202, upon acquiring the plurality of window frames of real time images, a foreground associated with the image disposed in at least one window frame of the image is captured, wherein a BG means is adapted to derive a background from the image.

In the next step 204, at least one quality parameter of the image around the captured foreground region is enhanced, wherein the quality parameters associated with the region of interest in the image comprises pixel data characteristics including contrast, brightness or sharpening. In a preferred embodiment, the quality parameter of the image can be enhanced for the selected regions based on the output of BG in order to reduce the computation resources of the computing system.

In the next step 206, at least one of the HOG classifiers for the designated foreground of the image are derived, wherein the HOG classifiers detect at least one human for first level human detection.

In the next step 208, at least one Haar classifier is derived upon countering positive first level human detection, wherein the Haar classifiers detect the face of the human for second level of human detection. In the next step, the number of humans present in the image can be counted by employing any one of the generally known counters 120.

In the final step, the final human detection decision and number thereof in at least one image of real time human tracking is sent to the remote server 110 by employing any one of the generally known transmission means 122 for security and surveillance purposes.

Figure 3:
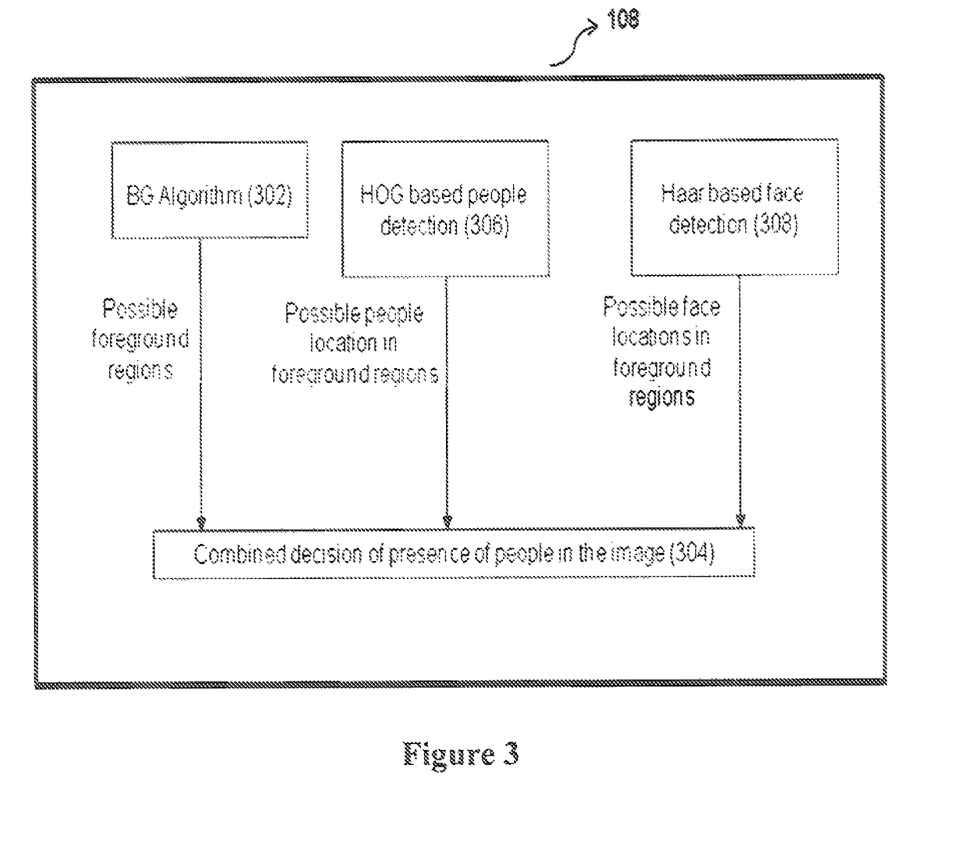
FIG. 3 illustrates a method of combining BG, HOG and Haar with respect to region of interest in parallel form.

FIG. 3 illustrates a method 108 of combining BG, HOG and Haar with respect to a region of interest in parallel form. In the initial step of the proposed method, a plurality of window frames of real time images associated with at least one human is acquired by employing at least one sensor 104, wherein the images capture an indoor or outdoor environment associated with the human. In one exemplary embodiment, the sensor 104 can be any one of an IR sensor, color camera, or at least one interference sensor.

Upon acquiring the plurality of window frames of real time images, a foreground 302 associated with the image disposed in at least one window frame of the image is captured, wherein a BG means is adapted to derive a background from the image. Subsequently, at least one HOG classifier for the designated foreground of the image is derived, wherein the HOG classifiers detect the presence of at least one human 306 in the image.

Subsequently, at least one Haar classifier is derived, wherein the Haar classifiers detect the face 308 of the human in the image. Next, a plurality of feature classifiers generated from BG, HOG and Haar are combined 304 in spatial domain analysis by employing combining means 116, wherein the spatial domain analysis comprises of the probability of the pixel containing the human as determined individually by changes in background, amount of activity in the image and HOG and Haar output.

In a preferred embodiment, the feature classifiers disposed in the pre-identified area of interest is used for deriving cues for background, human and face detection and the combining of a plurality of feature classifiers transforms one or more weak classifiers associated with the image due to long distance image capture, color of the image, or lesser face exposure into a strong classifier that does not require training of an associated data set for human detection and are configured to provide precise human detection.

In another embodiment, a threshold associated with the combined output of the feature classifiers generated from BG, HOG and Haar is determined by employing combining means 116 for human detection decision making.

Upon combining the plurality of feature classifiers, a linear probability of human detection based on predetermined threshold value of feature classifier in at least one window frame of the image is evaluated by employing evaluation means 118, wherein the evaluation can be a comparison of the threshold associated with the combined output of the feature classifiers generated from BG, HOG and Haar with the predefined threshold for human detection decision making.

In a preferred embodiment, the predefined threshold can be obtained by combining the weaker classifier associated with the image due to long distance image capture, color of the image and lesser face exposure, etc.

Next, the number of humans present in the image can be counted by employing any one of the generally known counters 120. In the final step, the final human detection decision and number thereof in at least one image of real time human tracking is sent to the remote server 110 by employing any one of the generally known transmission means 122 for security and surveillance purposes.

Figure 4:
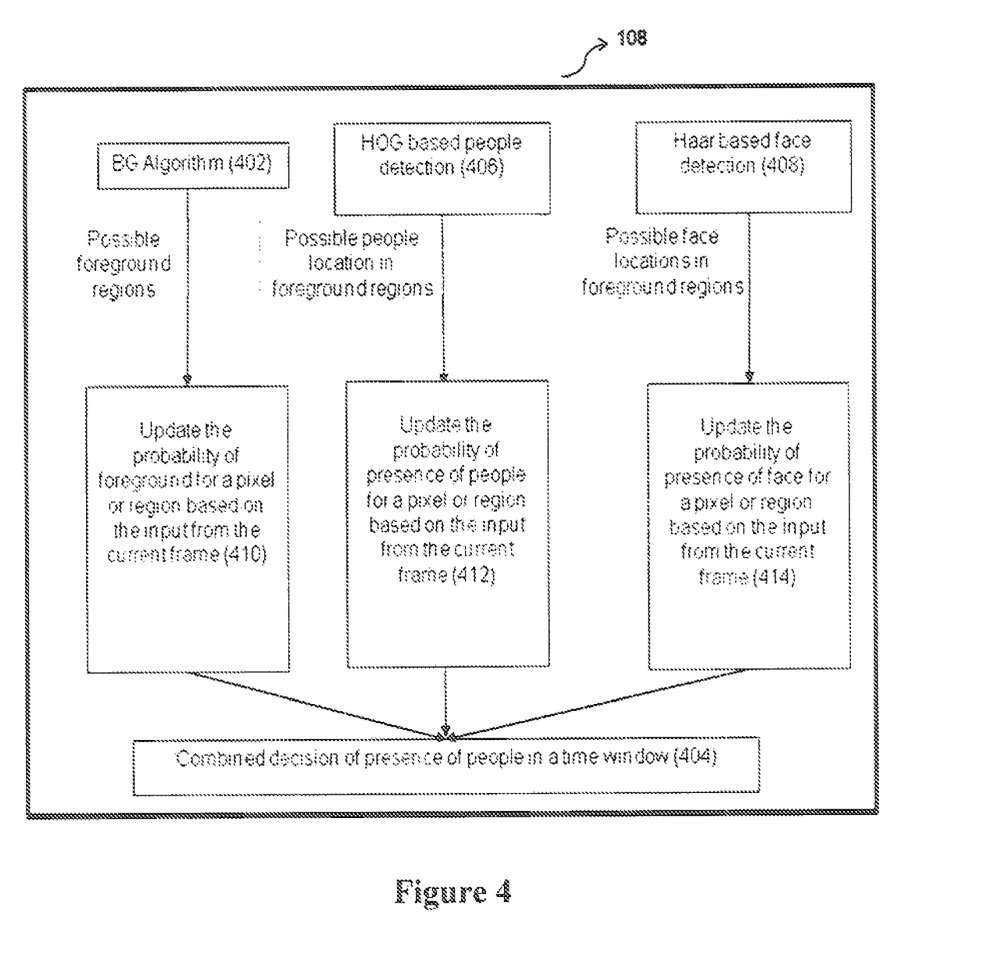
FIG. 4 illustrates a method of combining BG, HOG and Haar with respect to region of interest in time.

FIG. 4 illustrates a method 108 of combining BG, HOG and Haar with respect to region of interest in time. In the initial step of the proposed method, a plurality of window frames of real-time images associated with at least one human is acquired by employing at least one sensor 104, wherein the images capture an indoor or outdoor environment associated with the human.

In one exemplary embodiment, the sensor 104 can be any one of an IR sensor, a color camera, or at least one interference sensor. Upon acquiring the plurality of window frames of real-time images, a foreground 402 associated with the image disposed in at least one window frame of the image is captured, wherein a BG means is adapted to derive a background from the image.

Subsequently, at least one HOG classifier for the designated foreground of the image is derived, wherein the HOG classifiers detect the presence of at least one human 406 in the image. Subsequently, at least one Haar classifier is derived, wherein the Haar classifiers detect the face 408 of the human in the image. Next, a plurality of feature classifiers generated from BG, HOG and Haar is combined 304 in time domain analysis by employing a combining means 116, wherein the time domain analysis comprises deriving the linear probability of each pixel over time associated with the pixels in each window, the threshold value of combined feature classifiers facilitating an intermittent probability evaluation leading to a final decision of presence of the human in the tracked image.

In a preferred embodiment, the feature classifiers disposed in the pre-identified area of interest are used for deriving cues for background, human and face detection and the combining of a plurality of feature classifier to transform one or more weak classifiers associated with the image due to long distance image capture, color of the image or lesser face exposure into a strong classifier that does not require training of an associated data set for human detection and are configured to provide precise human detection. In a preferred embodiment, a threshold associated with the combined output of the feature classifiers generated from BG, HOG and Haar is determined by employing combining means 116 for human detection decision making.

Upon combining the plurality of feature classifiers, a linear probability of human detection based on a predetermined threshold value of a feature classifier in at least one window frame of the image is evaluated by employing evaluation means 118, wherein the evaluation can be a comparison of the threshold associated with the combined output of the feature classifiers generated from BG, HOG and Haar with the predefined threshold for human detection decision making. In a preferred embodiment, the predefined threshold can be obtained by combining the weaker classifier associated with the image due to long distance image capture, color of the image and lesser face exposure, etc.

Next, the number of human present in the image can be counted by employing any one of the generally known counters 120. In the final step, the final human detection decision and number thereof in at least one image of real-time human tracking is sent to the remote server 110 by employing any one of the generally known transmission means 122 for security and surveillance purposes.

Figure 5:
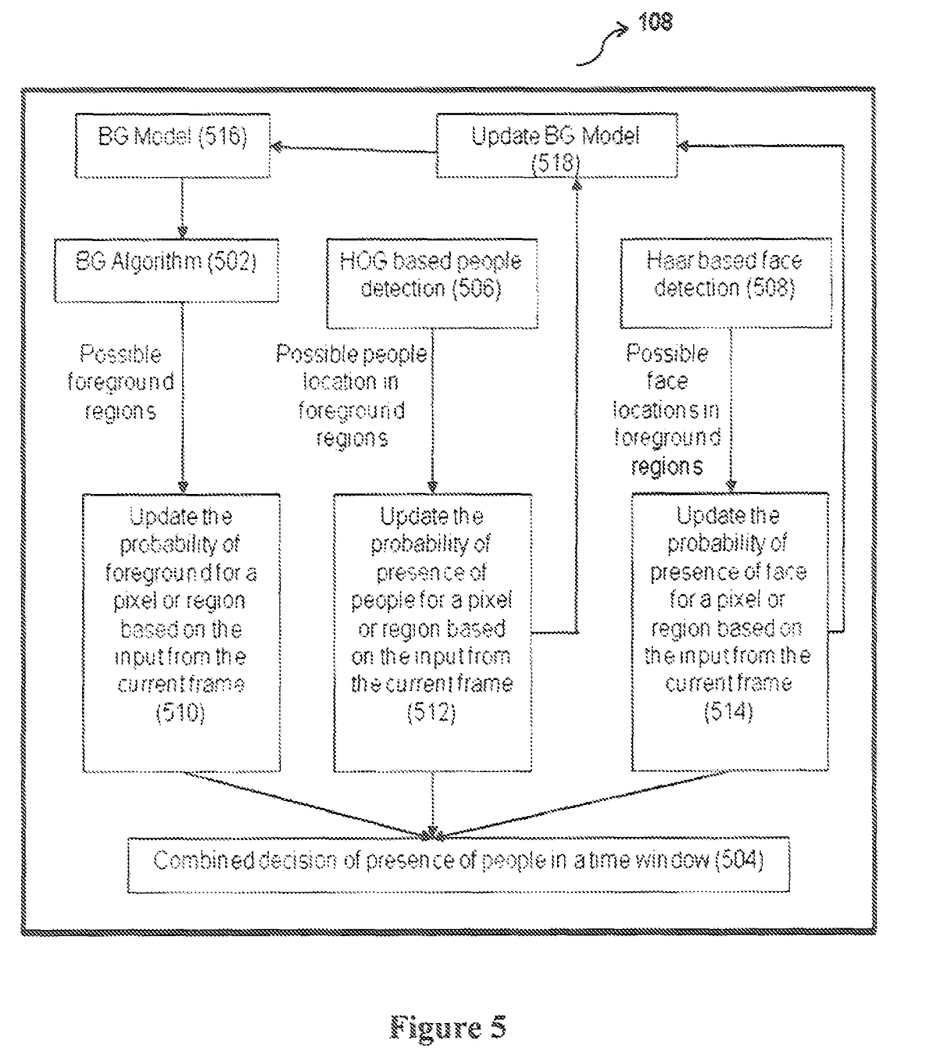
FIG. 5 illustrates a method for updation of BG model using the region of interest of HOG and Haar.

FIG. 5 illustrates a method 108 for updating a BG model using the region of interest of HOG and Haar. The method is similar to the method as explained in the FIG. 4. In this method, additionally, a foreground 502 associated with the image disposed in at least one window frame of the image is captured, wherein a BG means is adapted to derive a background from the image, in the absence of pre-existing background information, by sequential clustering for background reconstruction. The above said background reconstruction 518 is initiated by weighting the strength of feature classifiers output generated from HOG and Haar. A region of interest in the image based on the background change detection is determined and the background associated with the image is adaptively modeled by weighting the strength of feature classifiers output generated from HOG and Haar, wherein a revised BG adapted to handle plurality of backgrounds and with repeatedly changing background characteristics.

Accordingly, the system 100 uses all these different algorithms and different methods, which are mentioned in the FIGS. 2-5, and it does a good matching technique to detect people.

According to another embodiment, the challenges are mainly getting the thresholds for the final decision in the presence of the people, which are overcome by using adaptive methodology which drastically reduces both misses and false positives. Because the exiting algorithm for BG is not performing well with only one channel (gray) of image information. HoG is not performing in a very accurate way due to unavailability of all human postures.

According to another embodiment, the system 100 does not assume any previous assumptions (either lighting, posture of different persons, static objects movement). So the system 100 is robust and can tackle any environment/background changes. Adaptive learning is being used during the entire process by the system 100.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle and scope.

We claim:

1. A method for detecting a human present in an image, the method comprising:

acquiring, by utilizing instructions from memory that are executed by a processor, an image associated with the human, from a light detection sensor;

capturing, by utilizing instructions from memory that are executed by the processor, a foreground of the image associated with the human using background modeling (BG);

enhancing, by utilizing instructions from memory that are executed by the processor, a quality parameter of the image associated with the human around the foreground to generate a designated foreground;

deriving, by utilizing instructions from memory that are executed by the processor, a histogram of an oriented gradient (HOG) classifier for the designated foreground of the image associated with the human, wherein the HOG classifier is derived to detect the human in the image associated with the human;

deriving, by utilizing instructions from memory that are executed by the processor, a Haar classifier upon detecting the human, wherein the Haar classifier is derived to detect a face corresponding to each human present in the image associated with the human; and combining, by utilizing instructions from memory that are executed by the processor, the designated foreground generated using the BG, the HOG classifier, and the Haar classifier to perform a time domain analysis in order to detect presence of the human in the image associated with the human, wherein the time domain analysis indicates each pixel, associated the human, is analyzed over a period of time to determine a probability indicating the presence of the human detected in the image associated with the human.

2. The method of claim 1, wherein the image associated with the human comprises an infrared image or a color image.

3. The method of claim 1, wherein the quality parameter is associated with a region of interest of the image associated with the human, and wherein the quality parameter comprises pixel data characteristics selected from the group consisting of contrast, brightness, sharpening or a combination thereof.

4. The method of claim 1, wherein the combining further comprises transforming a weak classifier associated with the image associated with the human into a strong classifier in order to detect the human present in the image associated with the human, and wherein the weak classifier is generated due to one selected from the group of long distance image capture, color of the image associated with the human, lesser face exposure or a combination thereof.

5. The method of claim 1, wherein the foreground derived using the BG, the HOG classifier, and the Haar classifier are combined to perform a spatial domain analysis, and wherein the spatial domain analysis comprises a probability of a pixel detecting presence of the human by one selected from the group of a change in the background, an amount of activity in the image associated with the human, the HOG classifier, the Haar classifier, or a combination thereof.

6. The method of claim 1 further comprising counting number of the human present in the image associated with the human, wherein the human is counted based on the probability.

7. The method of claim 1 further comprising:
deriving a background from the image associated with the human by using the BG; and
updating the background to derive an updated background, wherein the updated background is derived based on the HOG classifier and the Haar classifier.

8. The method of claim 1, wherein the time domain analysis further comprises:
comparing the probability with a pre-defined threshold probability; and
detecting the human present in the image associated with the human based on the comparison.

9. The method of claim 1, wherein the predefined threshold probability is obtained by combining weaker classifiers associated with the image associated with the human, and wherein the weaker classifiers are generated due to long distance image capture, color of the image associated with the human and lesser face exposure.

10. A system for detecting a human present in an image, the system comprising:
a memory that stores instructions;
a processor that executes the instructions to perform operations comprising:
acquiring the image associated with the human from a light detection sensor;
capturing a foreground of the image associated with the human;
enhancing a quality parameter of the image associated with the human around the foreground to generate a designated foreground;
deriving a histogram of an oriented gradient (HOG) classifier for the designated foreground of the image associated with the human, wherein the HOG classifier is derived to detect the human in the image associated with the human;
deriving a Haar classifier upon detecting the human, wherein the Haar classifier is derived to detect a face corresponding to each of the human present in the image associated with the human; and
combining the designated foreground generated using the BG, the HOG classifier, and the Haar classifier to perform a time domain analysis in order to detect a presence of the human in the image associated with the human, wherein the time domain analysis indicates that each pixel associated the human is analyzed over a period of time to determine a probability indicating the presence of the human detected in the image associated with the human.

11. The system of claim 10, wherein the light detection sensor comprises an infrared sensor, a color camera, or an interference sensor.

* * * * *